April 23, 1957     O. MOSER     2,790,026
TELETYPEWRITERS Filed April 17, 1953     8 Sheets-Sheet 1

Inventor:
Otto Moser

April 23, 1957  O. MOSER  2,790,026
TELETYPEWRITERS
Filed April 17, 1953  8 Sheets-Sheet 3

Inventor:
Otto Moser

April 23, 1957 O. MOSER 2,790,026
TELETYPEWRITERS
Filed April 17, 1953 8 Sheets-Sheet 4

Fig.6

Inventor:
Otto Moser

April 23, 1957  O. MOSER  2,790,026
TELETYPEWRITERS
Filed April 17, 1953  8 Sheets-Sheet 6

Fig. 11

Inventor:
Otto Moser

Fig.13

United States Patent Office 2,790,026
Patented Apr. 23, 1957

2,790,026

TELETYPEWRITERS

Otto Moser, Bern, Switzerland

Application April 17, 1953, Serial No. 349,384

Claims priority, application Switzerland April 18, 1952

3 Claims. (Cl. 178—17)

My invention relates to teletypewriters in which each type character is transmitted or received through a single communication channel as a code combination of electric pulses.

The remote control device is part of the teletypewriter subscriber station. In the exchange operation, the device performs the functions necessary for making the desired connection and for securing the proper operation. These functions include: issuing the starting and stopping signal, issuing the series of number pulses for the selection of the called subscriber, and starting and disconnecting the electric motors of the teletypewriter.

In the known teletypewriters, the transmitting and receiving apparatus form a single complex of interengageable parts driven by a single motor. Various shortcomings are inherent in such a construction. Trouble in one part, for instance, requires taking the entire machine out of operation. Innovations are often difficult to introduce because changes in the transmitting portion of the machine may not be applicable without also changing the receiving portion, and vice versa. It is also impossible to install and operate the transmitting and receiving portions of such machines individually or independently of each other.

It is an object of my invention to eleminate these shortcomings.

To this end, and in accordance with one of the features of my invention, I construct a teletypewriter on a building-block principle and design the transmitting portion and the receiving portion of the machine as respective self-sufficient entities each having its own electric drive motor and both being separably connectable with each other or with a common base for conjoint operation.

These and other features, as well as further objects and advantages of my invention, will be apparent from, and will be referred to in, the following description of the embodiment and modifications of a teletypewriter apparatus according to the invention exemplified by the drawings in which.

Figure 1A:
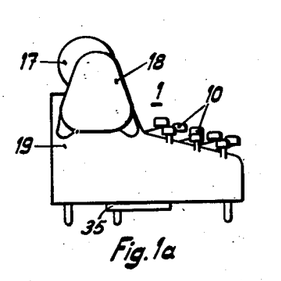
Figs. 1a and 1b are a side view and plan view respectively of the transmitting portion of the machine.
Figure 1B:
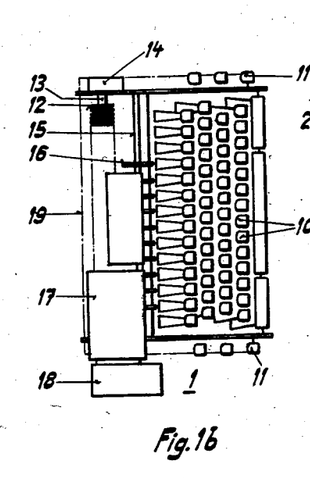

The essential parts of the transmitting portion 1 of the apparatus are apparent from Figs. 1a and 1b. The keyboard with the individually operable type keys 10 is located at the front in the customary manner. The control keys 11 for issuing the call signal, for releasing the identifying call code combination of the station, and for issuing the stop signal are disposed laterally of the keyboard. The device for transmitting the code pulse combinations occupies the rear space of the transmitting apparatus and comprises a multitude of cam discs 12 correlated to the respective type keys 10. The cam discs 12 are mounted side by side on a common shaft 13. Each cam is started to perform a single start-stop revolution when the one correlated type key is actuated. The rotating cam then operates, through mechanical intermediate members (not illustrated), a transmitter pulse contact 14 in accordance with the particular pulse combination to be issued to the communication channel.

Another shaft 15 is similarly equipped with cam disc 16 for controlling a number selecting pulse contact. The cam discs 16 are start-stop controlled by the number type keys of the keyboard. The two shafts 13 and 15 are driven by an electric motor 17 through an intermediate gear box 18. The mechanism of the apparatus, with the exception of the separately enclosed motor 18 and gear box 17, is accommodated within a housing 19.

While the details of the transmitter construction are not essential to the invention, it may be added that they may be similar to the transmitting portion of the known teletypewriters or, preferably, may be designed in accordance with my copending applications Serial No. 241,758, filed August 14, 1951, Electric Current Impulse Transmitter, now Patent No. 2,651,676; Serial No. 325,163, filed December 10, 1952, Apparatus for Issuing Pulse Combinations, now Patent No. 2,657,260; Serial No. 349,383, filed April 19, 1953, Teletypewriters.

Figure 2A:
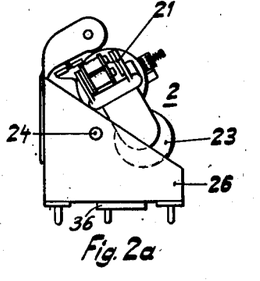
Figs. 2a and 2b are a side view and a plan view respectively of the receiving portion.
Figure 2B:
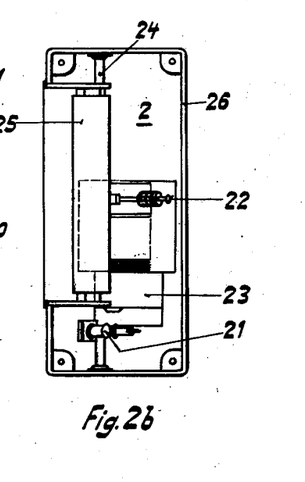

The receiving portion 2 of the apparatus illustrated in Figs. 2a and 2b has a pulse-receiving magnet 21 whose armature oscillates in accordance with the pulse combinations being received through the communication channel. Connected with the magnet and controlled by its armature is a translating mechanism whose control levers 27 cooperate in controlling the setting of the type wheel 22 of the printing device. The pulse magnet, the translating device and the printer, as well as a pertaining drive motor 23, form together an entity which is movable as a whole along a guide rod 24 so that the type wheel 22, during the receiving operation, travels along a platen roller 25. The apparatus is partly enclosed by a housing 26. The details of the mechanisms may also be designed in accordance with the receiving portion of the known teletypewriters. I prefer, however, applying a design as disclosed in my Patent No. 2,612,556 and in my copending application Serial No. 388,986, filed October 29, 1953, Teleprint Receiver.

It will be recognized that the transmitting portion and the receiving portion of the apparatus are each a self-sufficient structural entity with its own drive motor. Hence, each portion is operable individually and, if desired, may be installed and operated independently of the other.

Preferably suitable as drive motors are compound-excited direct-current motors whose operating current is supplied from an alternating-current line through a rectifier that also serves to energize other parts of the teletypewriter. It is particularly advantageous to mount the transmitting and receiving portions of the apparatus on a common base plate which also carries the electric equipment, mainly the so-called remote control device, and the just-mentioned power rectifier.

Figure 3A:
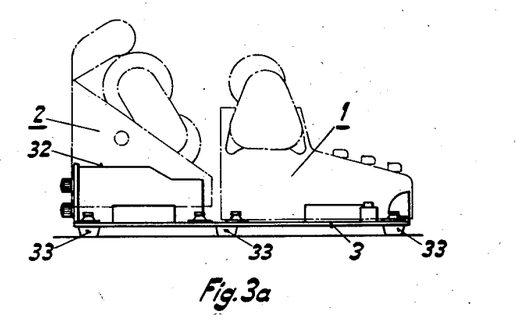
Figs. 3a and 3b are a side view and plan view of respectively a base-plate assembly common to the transmitting and receiving portions.
Figure 3B:
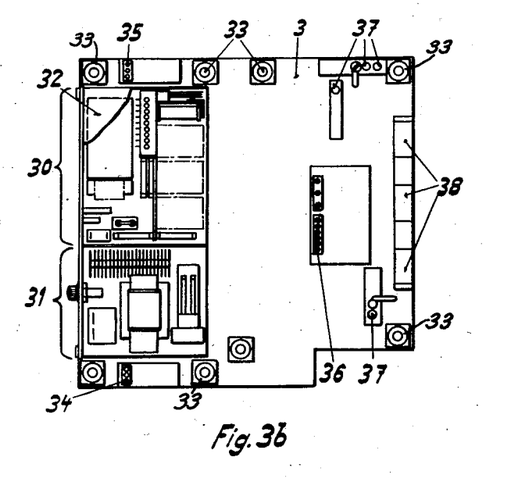
Figure 13:
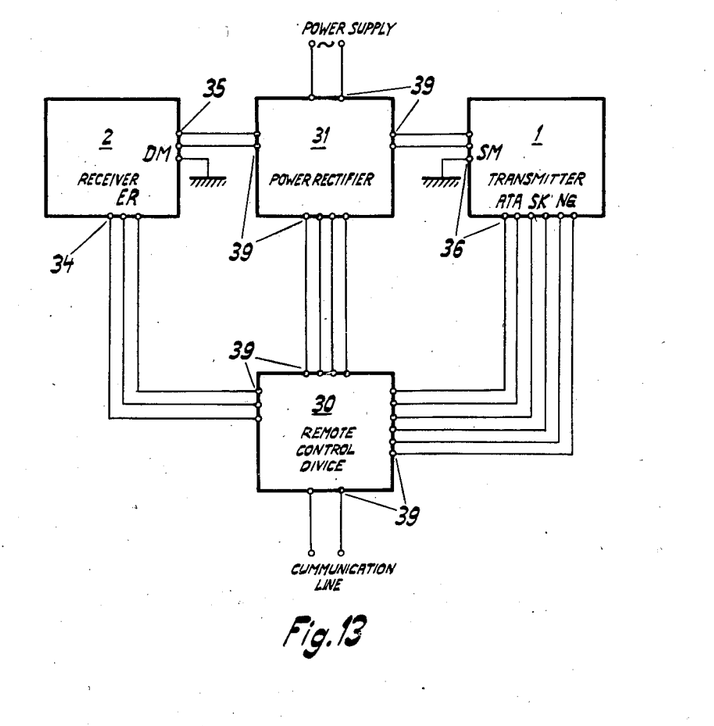
Fig. 13 is a schematic circuit diagram.

Such a base plate is shown in Figs. 3a and 3b. The transmitting apparatus and the receiving apparatus are preferably mounted one behind the other as is indicated in Fig. 3a by dot-and-dash lines. The remote control device 30 and the power rectifier 31 are mounted on the rear portion of base plate 3 and are covered by a single dust-proof hood 32. Transmitting unit 1 and receiving unit 2 are supported by rubber buffers 33 for damping the operating noise. The electric connection between the two units and the electric equipment is effected by plug contacts. As shown in the circuit diagram of Fig. 13, the plug 34 connects the pulse-receiving magnet of receiver 2 with the remote control device 30 through knife blade contacts 39, the plug 35 connects the receiver drive motor with power rectifier 31 through contacts 39, and the plug 36 connects the transmitter with the remote control device through knife blades 39. The base plate is equipped with push-button switches 37 actuated by the control keys (11 in Fig. 1b) of the transmitting apparatus through mechanical connecting members (not illustrated). Signal lamps 38 for indicating the operation of the teletypewriter are mounted along the front edge of base plate 3.

In all cases where the transmitting unit and the receiving unit are to be mounted separate from each other and are to be operated individually, for instance at hotel stations for the reception of messages, the common base plate may be substituted by separate base plates for the individual units respectively. This requires a subdivision of the base plate according to Figs. 3a and 3b into two parts. The spacially separate operation of transmitting and receiving units also requires a subdivision of the electric equipment of the base plate assembly. That is, each unit must be provided with a remote control device and a power rectifier. The electric equipment for each unit is again preferably mounted directly on the base plate.

Figure 4A:
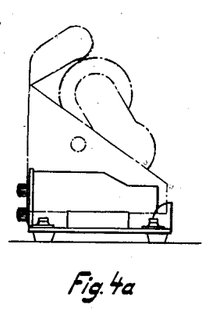
Figs. 4a and 4b are a side view and a plan view of a base plate for the receiving portion alone.
Figure 4B:
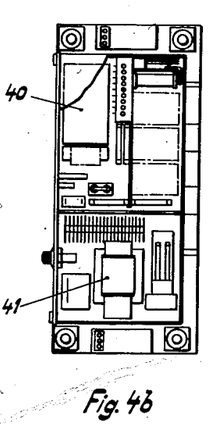
Figure 5A:
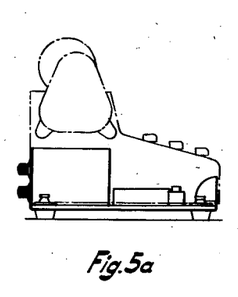
Figs. 5a and 5b are a side view and a plan view of a base plate for the transmitting portion alone.
Figure 5B:
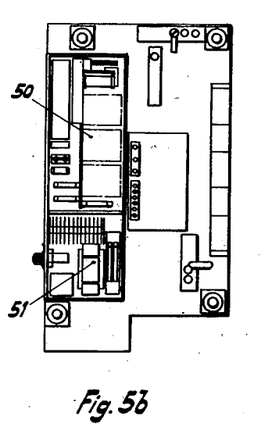

Figs. 4a and 4b show a base plate thus designed for the receiving unit, and Figs. 5a and 5b show a corresponding base plate for the transmitting unit. In Figs. 4a and 4b, the remote switching device and the power rectifier are denoted by 40 and 41 respectively, while in Fig. 5 the two corresponding components are shown at 50 and 51. The other details of these base plates are the same as the corresponding parts of the common base plate according to Figs. 3a and 3b.

In the illustrated embodiment of the receiving unit 2, the code-translating mechanism and the printer have a drive motor in common. In some cases, however, it may be desired to equip the translating mechanism and the printer with respective individual drive motors.

Figure 6:
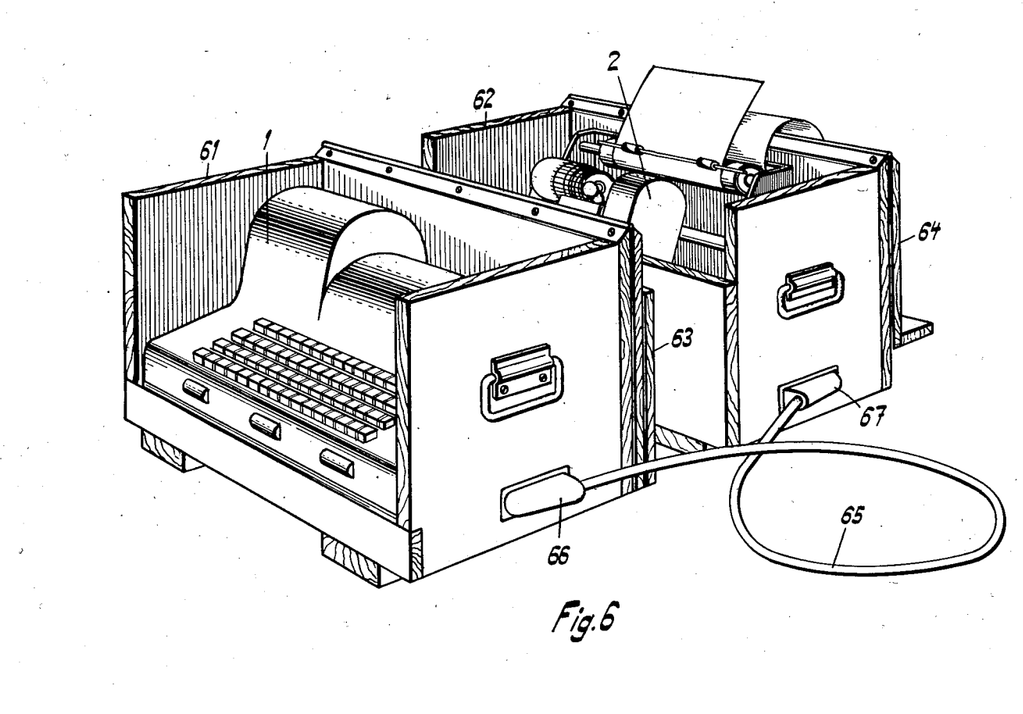
Fig. 6 is a perspective view of the transmitting and receiving portions placed in respective carrying cases.

To facilitate, for use in the field, the transport of the apparatus, the two units with the respective separate base-plate assemblies may advantageously be mounted in portable carrying cases, such as the wooden boxes shown in Fig. 6.

Figure 7:
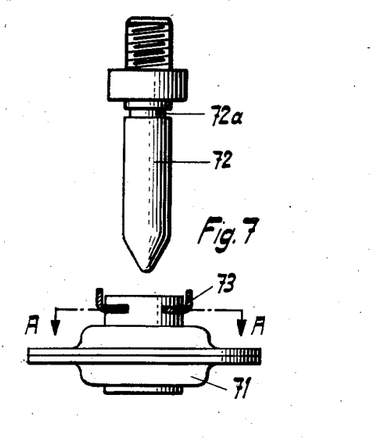
Fig. 7 is a view of noise-damping mounting means for securing the apparatus portions to the base plate.
Figure 8:
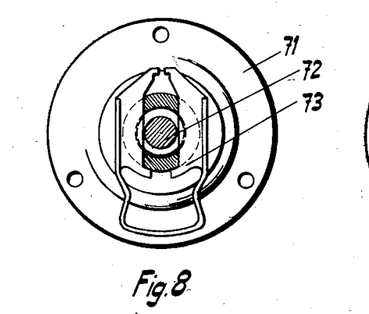
Figs. 8 and 9 show the same mounting means in cross section along the line A—A in Fig. 7, the two figures showing the mounting means in locked and unlocked conditions respectively.
Figure 9:
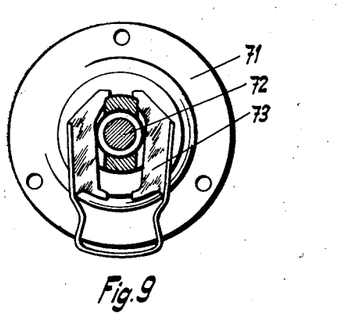

The plug connections for mounting each unit on the base are preferably designed as noise dampening devices. As shown in Fig. 7, a housing 71 contains the damping material, for instance, rubber. The housing has a central bore for the reception of a plug pin 72 secured to the apparatus unit. A safety clamp 73 engages a groove 72a of pin 72 when the pin is inserted into the bore of the housing. The clamp then locks the apparatus to the base plate. Fig. 8 shows the mounting with the plug locked by the safety clamp. For releasing the lock, for instance when the unit is to be disassembled, the clamp 73 is merely pulled out into the position shown in Fig. 9. The two limbs of the clamp then spread apart to permit withdrawing the pin 72.

Figure 10:
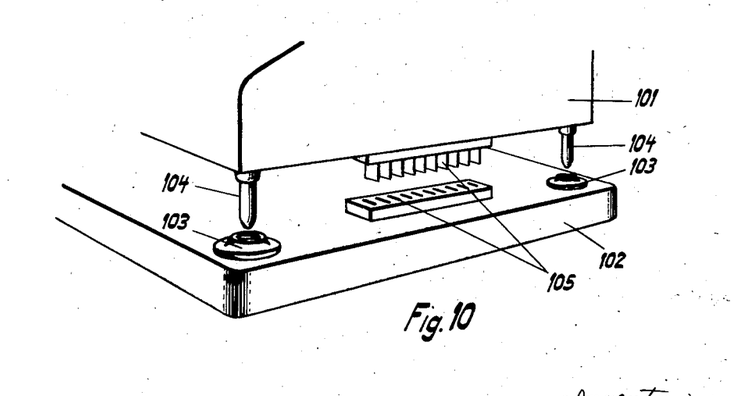
Fig. 10 is a perspective view of an apparatus equipped with the mounting means according to Fig. 7.

The particular design of these mounts with a pin guided in a bore permits using them also as a guide for the electric plug contacts. This requires merely a corresponding arrangement of the electric connections between the electric equipment and the contact sockets of the base-plate assembly. Fig. 10 shows a design suitable for this purpose. The transmitter or receiver unit is denoted by 101 and the pertaining base plate by 102. Secured to the base plate are the housings 103 of the mounting means to coact with plug pins 104 of unit 101. The housings 103 and pins 104 may be designed in accordance with Figs. 7 to 9. The electric plug contacts for connecting the unit 101 with the electric equipment mounted on the base plate 102 are located between the two pins 104. The pins 104 are longer than the pins of the electric plug contacts. Consequently, when the apparatus 101 is placed on the base and the tips of pins 104 are inserted into the respective bores of housings 103, the pins of the electric contact plugs will automatically slide into the proper sockets.

The described teletypewriter eliminates all introductorily mentioned disadvantages. For instance, trouble may be rapidly and safely eliminated in a simple manner by exchanging only the affected apparatus unit, or as the case may be, the base plate. The building-block principle also simplifies the manufacture as well as the maintanence of the machine.

To make the electric components of the base-plate assembly more readily accessible and exchangeable, the electric components of the assembly are mounted on one or several parts which are movable relative to the rest of the base plate in a drawer-like fashion. Preferably, the remote control device and the power rectifier are individually disposed on such drawer-like parts, and the conductive connections of each with the electric equipment on the main part of the base plate are preferably effected by knife-blade contacts.

Figure 11:
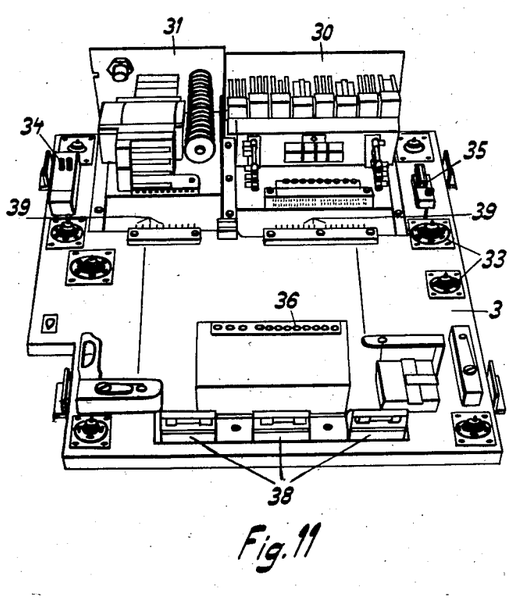
Fig. 11 is a perspective view of a base-plate assembly comparable with that of Figs. 3a and 3b but improved by a modified design.

In the embodiment illustrated in Fig. 11, the remote control device 30 and the power supply rectifier 31 are arranged on separate slide parts of the base plate. The design is otherwise similar to that of Figs. 3a and 3b, the same reference numerals being used for respectively similar elements.

The remote control device 30 and the power rectifier 31 are accommodated in the rear portion of the base plate 3 which in this case is common to the transmitter and receiver units (both not shown in Fig. 11). Device 30 and rectifier 31 are located on separate parts of base plate 3 which can be pulled out of the base plate 3 independently of each other in the manner of a drawer. The conductive connections between the electric equipment, namely the remote control device 30 and the rectifier 31, with the fixed terminals for the transmitting or receiving unit is effected by knife-blade contacts 39. Also mounted on the base plate 3 are plug contacts 34, 35, and 36. The front portion of the base plate 3 is equipped with signal lamps 38.

Figure 12:
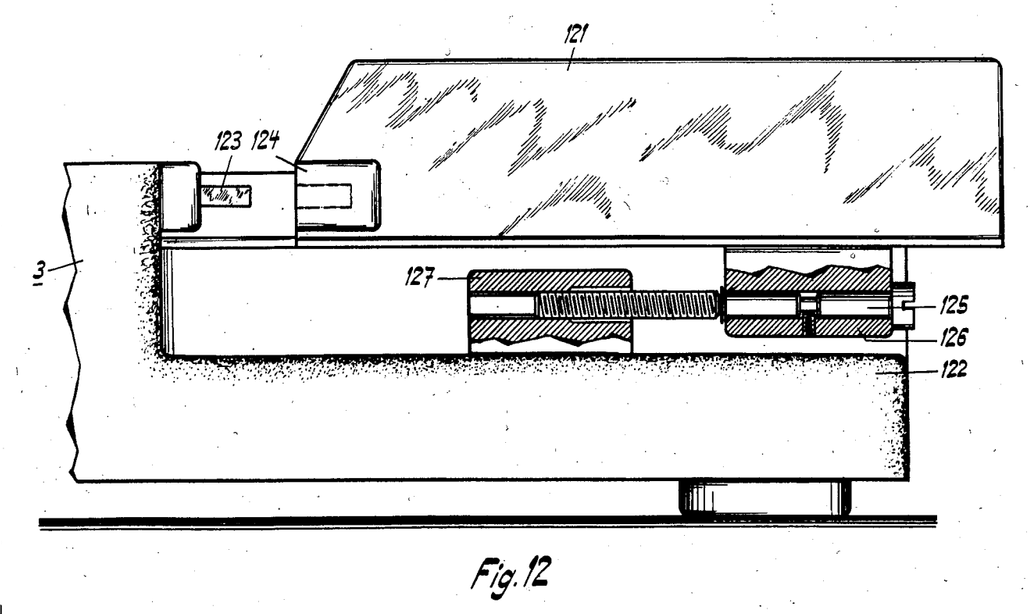
Fig. 12 is a detailed view of part of a base-plate assembly according to Fig. 11.

The movable parts of the base-plate assembly are preferably secured to the rest of the base plate by connecting screws so designed that they serve also as a guide for the knife-blade contacts when assembling the teletypewriter. Such a screw connection is shown in Fig. 12. The drawer-like part 121 of the base-plate assembly is slidable relative to the stationary main part 122 of plate 3. Part 122 carries a contact plug 123 to engage a socket 124 on the drawer-like part 121 when the latter is fully inserted. The movable part 121 carries an accurately journalled screw bolt 125 prevented from longitudinal displacement by means of a set screw 126. When assembling the apparatus, the screw bolt 125 is inserted into a threaded block 127 secured to the stationary part 122 of the base plate. Then the drawer-like part 121 is moved into the base plate by tightening the screw 125 against the block 127. In this manner an accurate setting and fastening of the part 121 with the components mounted thereon is secured as well as an accurate setting of the contact plug 123 in the pertaining socket 124. With separate transmitting and receiving units, each having its own base plate, each individual base plate is provided with electric components comprising a power rectifier and a remote control device as already described in detail. Also in the latter case, the electric components may be mounted on drawer-like parts of the base plate as explained with reference to Figs. 11 and 12. For protection from mechanical injury, dust or humidity, the electric equipment, especially the power rectifier and the remote control device, may be enclosed by a common hood or by separate covers.

The described teletypewriter apparatus have the considerable advantage that the electric equipment can be pulled out of the base-plate assembly and hence, is easily accessible for inspection, repair or replacement without disassembling the rest of the transmitting or receiving unit.

Various modifications other than those specifically illustrated and described will be obvious to those skilled in the art upon a study of this disclosure and can be made without departure from the essence of my invention and within the scope of the claims annexed hereto.

I claim:

1. Teletypewriter apparatus, comprising a transmitting portion having a keyboard assembly and a receiving portion having a typing assembly, said two portions forming respective inherently complete and individually operable units mechanically independent of each other, each of said two units having its own drive motor, base structure on which said units are separably mounted, communication-line-connection means and power-supply means mounted on said base structure, two groups of electric coupling members fixed on said base structure, each group having coupling members connected with said line-connection means and other coupling members connected with said power supply means, and each of said two units having another group of electric coupling members matingly engageable with said members of one of said respective groups on said base structure, the receiving portion being equipped with a printing device including a platen roller, the printing device being actuated upon operation of the keys of the keyboard, the receiving portion being so positionable with respect to the transmitting portion, and the platen roller being so positioned upon the receiving portion at a height higher than the said keyboard and longitudinally of the rows of keys comprising said keyboard, that the resulting printing is plainly visible to the operator while typing upon the keyboard.

2. Teletypewriter apparatus, comprising a transmitting portion having a keyboard assembly and a receiving portion having a typing assembly, said two portions forming respective inherently complete and individually operable units having its own drive motor, a single base plate on which both said units are separably mounted, electric control means fixed on said base plate and comprising a power-supply assembly and a signal-responsive relay assembly, two groups of electric coupling sockets fixed on said base plate, each group comprising sockets connected with said power supply assembly and other sockets connected with said relay assembly, and each of said two units having a group of plug pins electrically engageable with said sockets of one of said respective socket groups for electrically connecting each unit with said control means, the transmitting portion being mounted on the single base plate toward the front thereof, the keyboard being likewise positioned toward the front, and the receiving portion being mounted on the single base plate rearwardly of the transmitting portion, the receiving portion being equipped with a printing device including a platen roller, the printing device being actuated upon operation of the keys of the keyboard, the receiving portion being so mounted upon the base plate and its platen roller being so positioned at a height higher than the keyboard that the resulting printing is plainly visible to the operator while typing upon the keyboard.

3. Teletypewriter apparatus, comprising a transmitter portion having a keyboard assembly and a receiver portion having a typing assembly, said two portions forming respective inherently complete and individually operable units and having each its own drive motor, two base plates on which said respective units are separably mounted, each of said base plates having electric control means fixed thereto and comprising a power-supply assembly and a signal-responsive relay assembly, each base plate having electric coupling sockets connected with said control means, each of said units having plug pins engageable with said respective sockets, and conductor means removably coupled with said respective base plates and connecting said respective control means of said two plates with each other, the receiving portion being equipped with a printing device including a platen roller, the printing device being actuated upon operation of the keys of the keyboard, the receiving portion being so positionable with respect to the transmitting portion, and the platen roller being so positioned upon the receiving portion at a height higher than the said keyboard and longitudinally of the rows of keys comprising said keyboard, that the resulting printing is plainly visible to the operator while typing upon the keyboard.

References Cited in the file of this patent

UNITED STATES PATENTS

| | | |
|---|---|---|
| 679,310 | Hall | July 30, 1901 |
| 1,801,528 | Okanoto | Apr. 21, 1931 |
| 1,872,126 | Daine et al. | Aug. 16, 1932 |
| 1,965,602 | Lake | July 10, 1934 |
| 2,329,652 | Reiber | Sept. 14, 1943 |
| 2,438,454 | Riebe | Mar. 23, 1948 |
| 2,439,326 | Wilson | Apr. 6, 1948 |
| 2,488,372 | Breisch | Nov. 14, 1949 |
| 2,494,232 | Estoup | Jan. 10, 1950 |
| 2,495,531 | Lederer | Jan. 24, 1950 |
| 2,502,307 | Bascom | Mar. 28, 1950 |
| 2,651,676 | Moser | Sept. 8, 1953 |